United States Patent [19]

Karwacki

[11] Patent Number: 5,058,431
[45] Date of Patent: Oct. 22, 1991

[54] SUPERCONDUCTING JOSEPHSON JUNCTION GYROSCOPE APPARATUS

[75] Inventor: Francis A. Karwacki, Lansdale, Pa.

[73] Assignee: The United States of America as represented by the Secretary of the Navy, Washington, D.C.

[21] Appl. No.: 527,963

[22] Filed: May 23, 1990

[51] Int. Cl.$^5$ ............................................. G01P 3/44
[52] U.S. Cl. ..................................... 73/505; 324/248
[58] Field of Search ................. 73/505, 518; 324/248; 505/842, 843

[56] References Cited

U.S. PATENT DOCUMENTS 3,657,927 4/1972 Tyson ..................................... 73/505
4,403,189 9/1983 Simmonds ........................... 324/248

OTHER PUBLICATIONS

J. E. Zimmerman et al., "Compton Wavelength of Superconducting Electrons," *Physical Review Letters*, vol. 14, No. 22, May 31, 1965, pp. 887–888.

Primary Examiner—John E. Chapman
Attorney, Agent, or Firm—James V. Tura; James B. Bechtel; Susan E. Verona

[57] ABSTRACT

A superconducting Josephson junction gyroscope for detecting rotational motion of a vehicle about an axis. A persistent current of Cooper-paired electrons travels around a thin-film superconducting ring and the phase change across a Josephson junction in the ring produces an output signal directly proportional to the rate of rotation of the platform.

15 Claims, 4 Drawing Sheets

SUPERCONDUCTING JOSEPHSON JUNCTION GYROSCOPE APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to gyroscopes for determining angular rates about a sensitive axis as required by an inertial guidance and navigation system of an aircraft: and more particularly to an improved gyroscope apparatus which utilizes the phase coherence of Cooper-paired electrons to measure the rotation of a platform.

Conventional guidance and navigation systems generally include a gyro-stabilized platform to measure the rate of angular motion of a vehicle. Early systems included an electrically driven rotor in one or two sets of gimbals mounted on the vehicle. Due to inaccuracies produced by friction between the moving parts, temperature changes and inadequate manufacturing tolerances, other devices have evolved which have no moving parts. In a nuclear gyroscope, for example, the spinning mass is replaced by the spin of atomic nuclei and electrons.

The current trend in non-mechanical sensors is the ring laser gyro (RLG). It consists of a resonant optical cavity on a platform and contains two laser beams traveling in opposite directions in a triangular or square shaped path formed by three or four mirrors. With the gyro at rest, the two beams have the identical frequency, but when rotated about its sensitive axis, the frequency of one beam decreases while the frequency of other increases. The frequency difference $\Delta f$ is a direct function of the angular rate of rotation, which is:

$$\Delta f = 4A\omega/L\lambda \tag{1}$$

where:
- $A$ = area enclosed by the optical path;
- $\omega$ = angular rate of rotation of the platform;
- $\lambda$ = transition wavelength of the laser beam; and
- $L$ = the optical path length.

The RLG is limited in its ability to measure applied rates more accurately by its mechanical dither and the spontaneous emission from the laser. Both mechanisms contribute to a random wander term in the output signal. Attempts to eliminate the dither motor have not proven successful. It is for these reasons that new technologies are being investigated to develop instruments with improved sensitivity.

The discovery of high temperature superconducting materials has spurred new interest in developing a gyroscope utilizing their unique properties. Recent studies include the London moment gyroscope to verify in earth's orbit two small precessional effects predicted by the theory of general relativity, the geodetic and Schiff motional effects. See, Anderson, J. T. et al, *Development of a London Moment Readout for a Superconducting Gyroscope*, American Institute of Physics (1978). A niobium-coated quartz sphere is electrostatically suspended, cooled to below the transition temperature, and spun in a vacuum. The magnetic moment of the sphere—the London moment—is aligned with the spin axis and the current in a readout loop is indicative of any change in orientation. The Barnett moment gyroscope is another sensor under study for use in navigation systems. It utilizes the same principles as the London moment except it is a cylinder with $\mu$-metal in the core to exhance the magnetic field intensity. Neither of these concepts, however, have reached the point of practicality as a substitute for gyros presently in use.

SUMMARY OF THE INVENTION

Accordingly, it is an object of the present invention to provide an improved gyroscope apparatus suitable for use in guidance and navigation systems utilizing the phase change of election pairs in a superconducting ring.

Another object of the invention is to provide an improved apparatus for precisely measuring the rotation rate of a vehicle by monitoring the phase change of Cooper-paired electrons.

Still another object is to provide a superconducting gyroscope which will accurately measure very small changes in angular rate of motion.

A further object is to provide a gyroscope which affords a considerable reduction in size and weight relative to prior art devices, and which has lower manufacturing and maintenance costs.

A still further object is to provide a gyroscope apparatus suitable for a wide range of applications including missiles, aircraft, surface and subsurface ships and similar platforms.

Briefly, these and other objects and aspects of the invention are achieved with a small solid state gyro utilizing a thin-film superconducting ring with a Josephson junction interposed in the ring to detect rotational motion about its input or sensitive axis. The sensing mechanism is a persistent current of Cooper-paired electrons traveling around the ring accumulating a phase change due to rotational motion about its sensitive axis. The ring in one configuration can be coupled to a superconducting quantum interference device (SQUID) which produces an output signal directly proportional to the rate of rotation.

Other objects, advantages and novel features of the invention will become apparent from the following detailed description of the invention when considered in conjunction with the accompanying drawings wherein:

DESCRIPTION OF THE PREFERRED EMBODIMENTS

Figure 1:
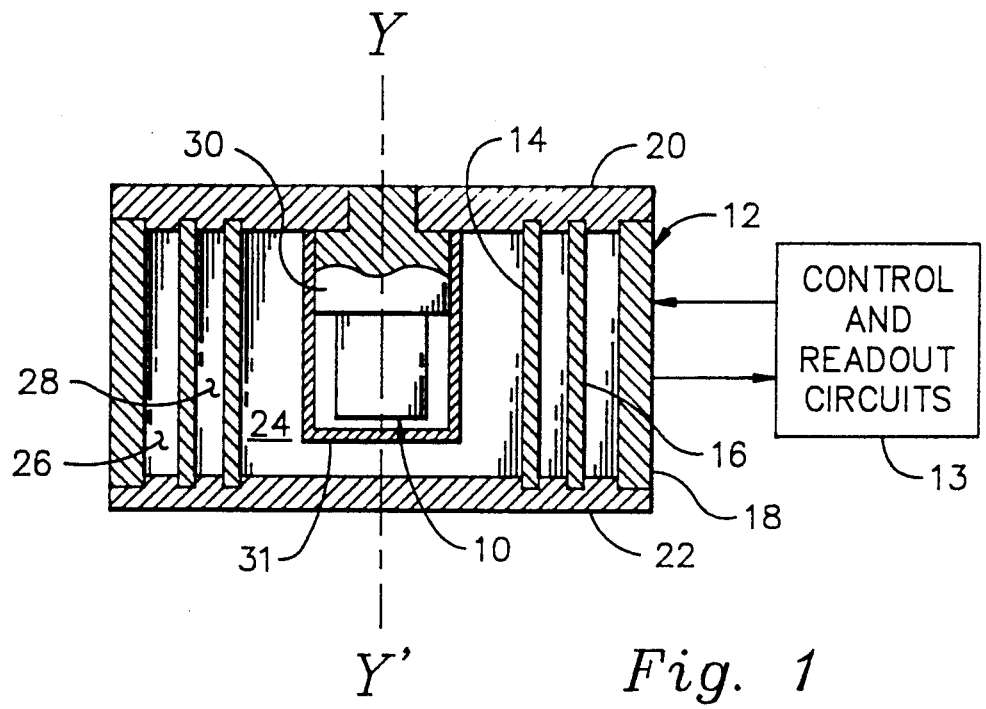
FIG. 1 is a schematic view in partial cross section of one embodiment of a superconducting Josephson junction gyroscope apparatus according to the invention.

Central to the inventive concept is the formation of bound pairs of electrons in a superconducting medium according to the well-known Bardeen-Cooper-Schrieffer (BCS) theory. As electrons travel through a lattice, the ions polarize in a direction perpendicular to the velocity of the electrons creating an effective attraction between the electron pairs. The pairing can be described by a wave function whose coherence length extends over a distance greater than the length of the lattice. Since a large number of pairs can occupy a given region of space in the lattice, there is an overlap of wave functions which may be described by a new many-bodied, highly correlated state of Cooper pairs moving with the same total center of mass momentum. This state can be used to successfully describe the observed measurements such as specific heat, entropy, etc., but is not successful in describing effects other than excitation, such as interference. The interference effects and boundary problems of this state are described by a macroscopic wave function given by:

$$\Psi(r,t) = \rho^{\frac{1}{2}}(r,t) e^{i\phi(r,t)} \quad (1)$$

where:

$\rho(e,\mathrm{rar}/\mathrm{r}/\,,t)$ = density of superconducting state,
$\phi(\vec{r},t)$ = phase of superconducting electrons,
r = position, and
t = time.

The Josephson junction gyroscope utilizes the phase coherent Cooper-paired electrons and a Josephson junction in a superconducting ring configuration to measure angular rate of motion about a sensitive axis. This is achieved by producing a persistent current in the ring with a weak link or Josephson junction and rotating the ring. As the superconducting electrons travel around the ring they will experience a phase change $\Delta\phi_e$ due to the angular motion. This change is represented by the following relationship:

$$\Delta\phi_e = \frac{2m}{\hbar} (\omega \cdot A) \quad (2)$$

where:

m = mass of electron,
= Planck's constant,
$\omega$ = the applied angular velocity, and
A = the area enclosed by the ring.

The phase change is detected by placing the Josephson junction in the loop. The current $I_0$ in the loop is then given by:

$$I_0 = I_c \sin(\Delta\phi_J^*) \quad (3)$$

where:

$I_c$ = critical current of the junction, and
$\Delta\phi_J^*$ = the gauge invariant phase change across the junction.

As shown below, the expression for $\Delta\phi_J^*$ is equal to the phase change $\Delta\phi_e$ due to rotation. Making this substitution, equation (2) becomes:

$$I_0 = I_c \sin(\Delta\phi_e) \quad (4)$$

As the phase changes with rotation, the current changes producing a change in flux in the ring. A measure of this flux change is a measure of the applied rotation of the ring.

An explanation for this phenomena is derived from basic theory and fundamental experiments with rotating superconductors, and in particular on the measurement of the ratio of Plank's constant to the electron mass m. The condensate of the Cooper-paired electrons in the ring is phase coherent similar to the photons in a ring laser, and as the electrons travel around the ring, a change in phase occurs due to any applied rotation of the ring. This phase change can be derived by placing the Hamiltonian function of a particle in a rotating reference frame into Schrodinger equations and manipulation of the equations into a form consistent with the expression for the continuity of charge. An expression for the current density J in the presence of a magnetic field, rotating with the angular velocity $\omega$, can be derived by placing the wave function for electrons in the expression for current density. Using this expression, the gradient of the quantum mechanical phase of the superconducting electrons acquired is:

$$\nabla\phi_e = \frac{m}{\rho e} J + \frac{2e}{ch} A + \frac{2m}{\hbar} (\omega X r) \quad (5)$$

Integrating the change in phase equation (5) around a ring interrupted by a Josephson junction results in the expression:

$$\oint \nabla\phi_e \cdot dr = \frac{m}{\rho e} \int_1^2 J \cdot dr + \frac{2e}{ch} \int_1^2 A \cdot dr + \frac{2m}{\hbar} \int_1^2 (\omega X r) \cdot dr + \delta\phi_J \quad (6)$$

where:

$\delta\phi_J$ = the phase difference across the junction,
$\int_1^2$ = the path of integration around the ring excluding the junction,
c = speed of light, and
$\rho$ = density of superconducting electrons.

Since the wave function is single-valued, the left side of equation (6) is restricted to an integer multiple of $2\pi$, i.e., $2\pi n$ where $n = 1, 2, 3 \ldots \infty$. If the integration path is taken in a region where the pair density is negligible, the first term in this equation can be omitted.

The gauge invariant expression for the phase difference can now be introduced to provide the missing portion of the integral. The gauge invariant phase $\delta\phi_J^*$ is:

$$\delta\phi_J^* = \delta\phi_J - \frac{2e}{ch} \int_1^2 A \cdot dr - \frac{2m}{\hbar} \int_1^2 (\omega X r) \cdot dr \quad (7)$$

Substituting this into equation (6), and integrating the resulting equation yields:

$$2\pi n = \delta\phi_J^* + 2\pi \frac{\Phi}{\Phi_o} + \frac{2m}{\hbar} (\omega \cdot A) \quad (8)$$

where:

$\Phi$ = the total flux, and
$\Phi_o$ = quantum flux.

Equation (8) dictates the phase behavior for the Cooper-paired electrons as they travel around the ring. The phase $\Delta\phi_J^*$ across the Josephson junction, when added to $2\pi$ times the enclosed flux fraction $\Phi/\Phi_o$, and also added to the applied rotation $\omega$, must equal an integer multiple number of $2\pi$. Substitution in the Josephson expression, equation (3), yields $$I_o = I_c \sin\left[2\pi \frac{\Phi}{\Phi_o} + \frac{2m}{\hbar}(\omega \cdot A)\right] \quad (9)$$

for the current in a superconducting ring. Thus, a ring with a Josephson junction carrying a current $I_c$, and rotating at an angular rate $\omega$, will modulate the current with a period proportional thereto.

Referring now to the drawings wherein like characters designate like or corresponding parts throughout the several views, the embodiment of FIG. 1, utilizing the above-described phenomena, shows a gyroscope apparatus for measuring the rate of an applied rotation, and includes a superconducting Josephson junction gyro 10 contained within a cryostat 12 and electrically connected to control and readout circuits 13. Cryostat 12 consists of three concentrically spaced shells 14, 16, and 18 sealed at their ends by covers 20 and 22 to form an inner liquid helium-filled chamber 24 and an outer liquid nitrogen-filled jacket 26 separated by a vacuum chamber 28 which provide insulation and cooling and maintain gyroscope 10 below a superconducting transition temperature defined hereinafter. Gyro 10 is centrally positioned in chamber 24 at the end of a support member 30 extending from top cover 20 and an evacuated enclosure 31 of a non-magnetic material having non-superconducting and superconducting coatings on the inner and outer surfaces for shielding a substantial amount of the ambient magnetic field. Cryostat 12 is preferably formed of stainless steel, and the liquid helium and liquid nitrogen are replenished as required by conventional means not shown.

Figure 2:
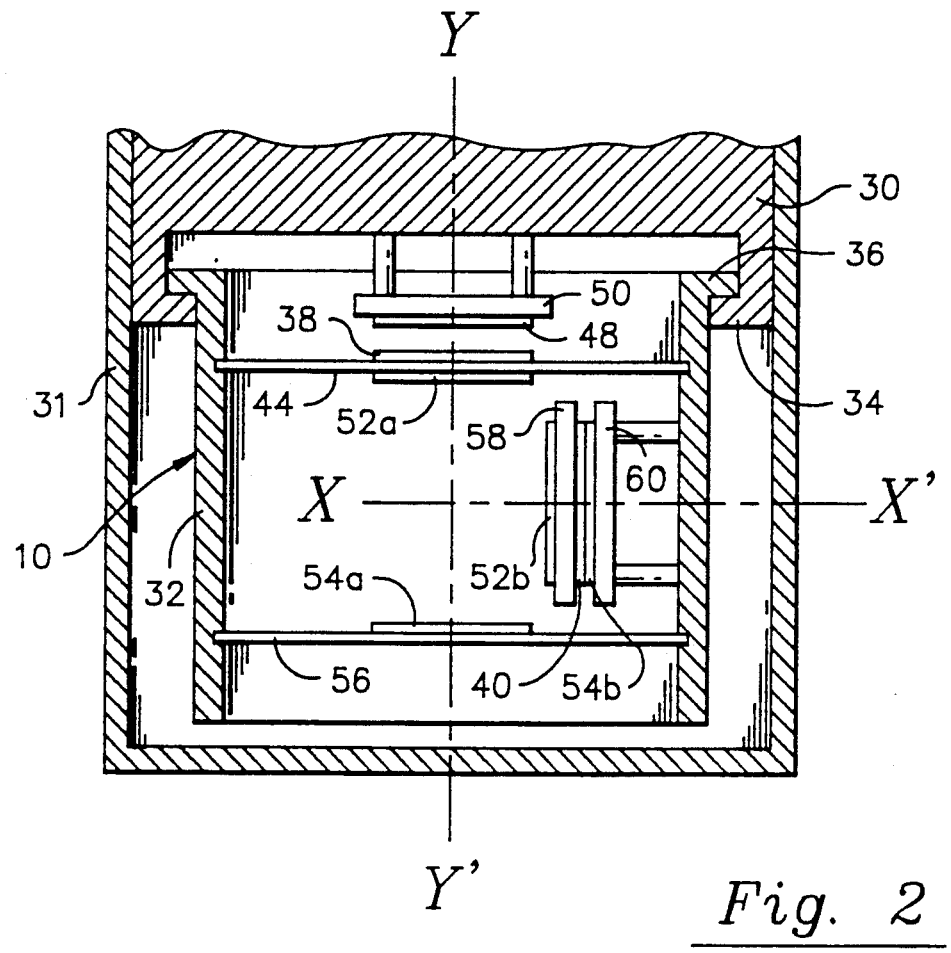
FIG. 2 is an enlarged view in partial cross section of the gyroscope of FIG. 1.
Figure 3:
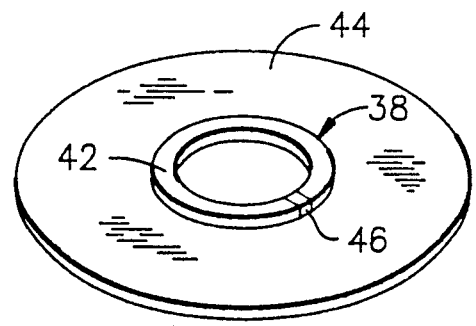
FIG. 3 is an enlarged isometric view of a superconducting ring suitable for use in the gyroscope of FIG. 2.

Referring to FIG. 2, gyro 10 comprises a cylindrical housing 32 with a flange 36 at one end interengaging a collar 34 at the free end of member 30. A superconducting ring 38 and an annular DC SQUID 40 are disposed within housing 36 on mutually perpendicular symmetry axes Y—Y' and X—X', respectively, with the Y-Y' axis being the axis sensitive to rotation. As best illustrated in FIG. 3, ring 38 includes a superconductor 42 of relatively low transition temperature such as niobium or tin deposited and formed in the shape of a toroid approximately $\frac{3}{8}$" diameter on a circular substrate 44 with a Josephson junction 46 formed by a thin insulating barrier radially separating two ends of superconductor 42. Substrate 44 is secured around its perimeter to the inner surface of housing 32 at the end proximal to shaft 30 and in a plane generally normal to the length of housing 32.

A substrate 50 fixed to the end of member 30 supports a starting coil 48 in coaxial alignment with and spaced from ring 38 which, when momentarily energized, causes a persistent current to flow in ring 38. This current is established by trapping flux in ring 38 during transition through the critical temperature of superconductor 42. The ambient or external magnetic field flux $\phi_{ext}$, and the field flux $\phi_{sr}$ resulting from the current flow in ring 38, are sensed by a first pick-up coil 52 (FIG. 5) through its primary winding 52a fixed to substrate 44 in coaxial alignment with ring 38. A second pick-up coil 54 has a primary winding 54a, magnetically remote from and coaxially aligned with ring 38, fixed to a circular substrate 56 which, in turn, is secured around its perimeter to the inner surface of housing 30 near the end opposite from ring 38.

SQUID 40 is a state-of-the-art superconducting ring with two Josephson junctions 40a and 40b (FIG. 4) for measuring very small induced currents. With a secondary winding 54b of coil 54, SQUID 40 is fixed between parallel substrates 58 and 60 in coaxial alignment with axis X—X'. Substrate 60 is also fixed to the side of housing 32.

Figure 4:
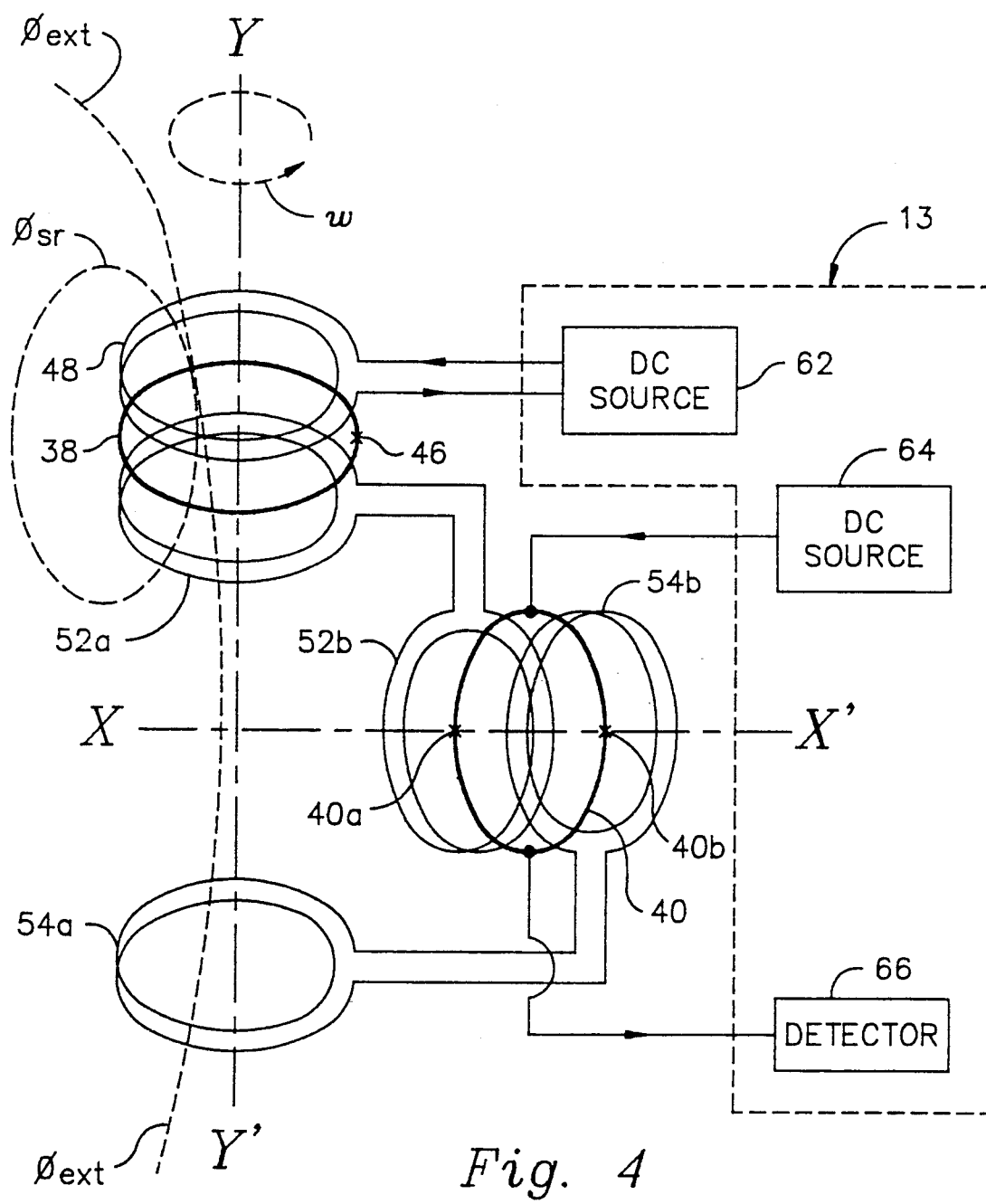
FIG. 4 is a schematic and block diagram of the apparatus of FIG. 1.

Referring to FIG. 4, control and readout circuits 13 include an electrical source 62 for momentarily energizing starting coil 48 to induce the persistent current in ring 38. A second constant current source 64 provides an input to SQUID 40, and a detector 66 measures any variation in the output signal with any change in the magnetic flux at SQUID 40. As best illustrated in FIG. 5, secondary winding 54b is turned 180° relative to secondary winding 52b so that directions of the sensed magnetic external flux $\phi_{ext}$ are opposite and produce a cancellation effect at SQUID 40.

Figure 5:
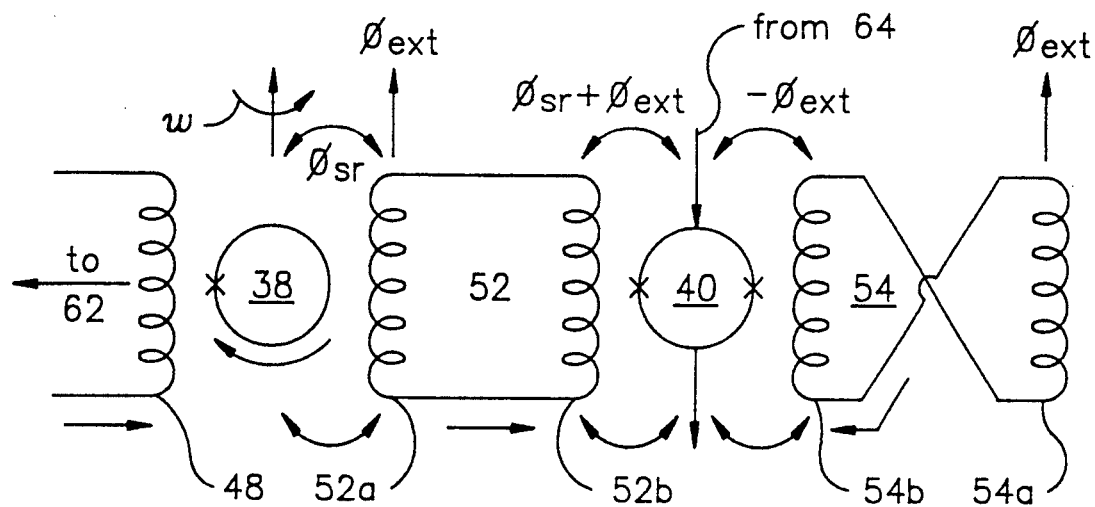
FIG. 5 is a schematic representation of the electrical components within the gyroscope of FIG. 1.

Operation of the above-described gyroscope apparatus should now be readily apparent and is summarized with particular reference to FIGS. 4 and 5. Source 62 applies a short pulse of DC current to starting coil 48, and the resulting magnetic field induces a persistent current in ring 38 which generates a continuous magnetic field of flux $\phi_{sr}$. This flux plus any ambient or external magnetic field flux $\phi_{ext}$ present in housing 32 generates a proportional current in pick-up coil 52, and a corresponding flux intensity at secondary winding 52b. To compensate for the external field flux $\phi_{ext}$, pick-up coil 54 produces a flux at secondary winding 54b opposite to the external field component in secondary winding 52b. The total flux $\Phi_T$ detected by SQUID 40 is therefore $$\Phi_T = k_1 k_1'(\phi_{sr} + \phi_{ext}) - k_2 k_2' \Phi_{ext} \quad (10)$$

where:
$\phi_{sr}$ = flux produced by superconducting ring,
$\phi_{ext}$ = external field flux, and
$k_1$, $k_1'$, $k_2$ and $k_2'$ = coupling factors.

For illustrative purposes, the coupling factors are set equal to one. In addition, the self-inductance of pick-up coils 52 and 54 are not considered.

The minimal detectable rate of rotation $\omega_{min}$ can be determined for this configuration. The flux in the superconducting ring 38 is $$\Phi_{sr} = A_{sr} B \quad (11)$$

and the magnetic field is $$B_{sr} = \frac{\mu_o I_{sr}}{2 r_{sr}} \quad (12)$$

where:
$A_{sr}$ = the enclosed area of the ring,
$B_{sr}$ = the magnetic field,
$\mu_o$ = the permeability of free space,
$r_{sr}$ = the radius of the ring, and
$I_{sr}$ = the current $I_o$ in the ring as defined in equation (9) above.

Placing these expressions for $\phi_{sr}$, $B_{sr}$ and $I_{sr}$ into equation (12), the expression for the total flux at SQUID 40 becomes, assuming no external field contribution, is:

$$\Phi_T = \frac{\mu_o}{2r_{sr}} \sin\left[\frac{2m}{\hbar}(\omega \cdot A)\right] \quad (13)$$

The minimal detectable rate $\omega_{min}$ is determined by defining $\omega$ as much less than 1 (one) in equation (13). This reduces $\sin\theta$ to $\theta$ for small angular changes and yields $$\Phi_{min} = \frac{\mu_o m I_c A_{sr}}{\hbar r_{sr}}(\omega_{min} \cdot A) \quad (14)$$

where:
$\Phi \equiv \Phi_{min}$; and
$\omega \equiv \omega_{min}$.

The minimal detectable flux for SQUID 40 defined in terms of the energy $E_{min}$ is $$\Phi_{min} = (E_{min}L)^{\frac{1}{2}} \quad (15)$$

where:
L = the inductance of the squid.

Substituting equation (14) in equation (15) and rearranging terms to define $\omega_{min}$ in terms of the other variables yields $$\omega_{min} = \left[\frac{\hbar r_{sr}}{\mu_o m I_c A_{sr}^2}\right](E_{min}L)^{\frac{1}{2}} \quad (16)$$

If, for example, $E_{min} = 10^{-31}$ joules, $L = 10^{-6}$ henrys, $A = 0.73$ cm$^2$, and $I_c = 10^{-6}$ amperes, the minimal detectable rate becomes 0.0056 degrees/hour.

Figure 6:
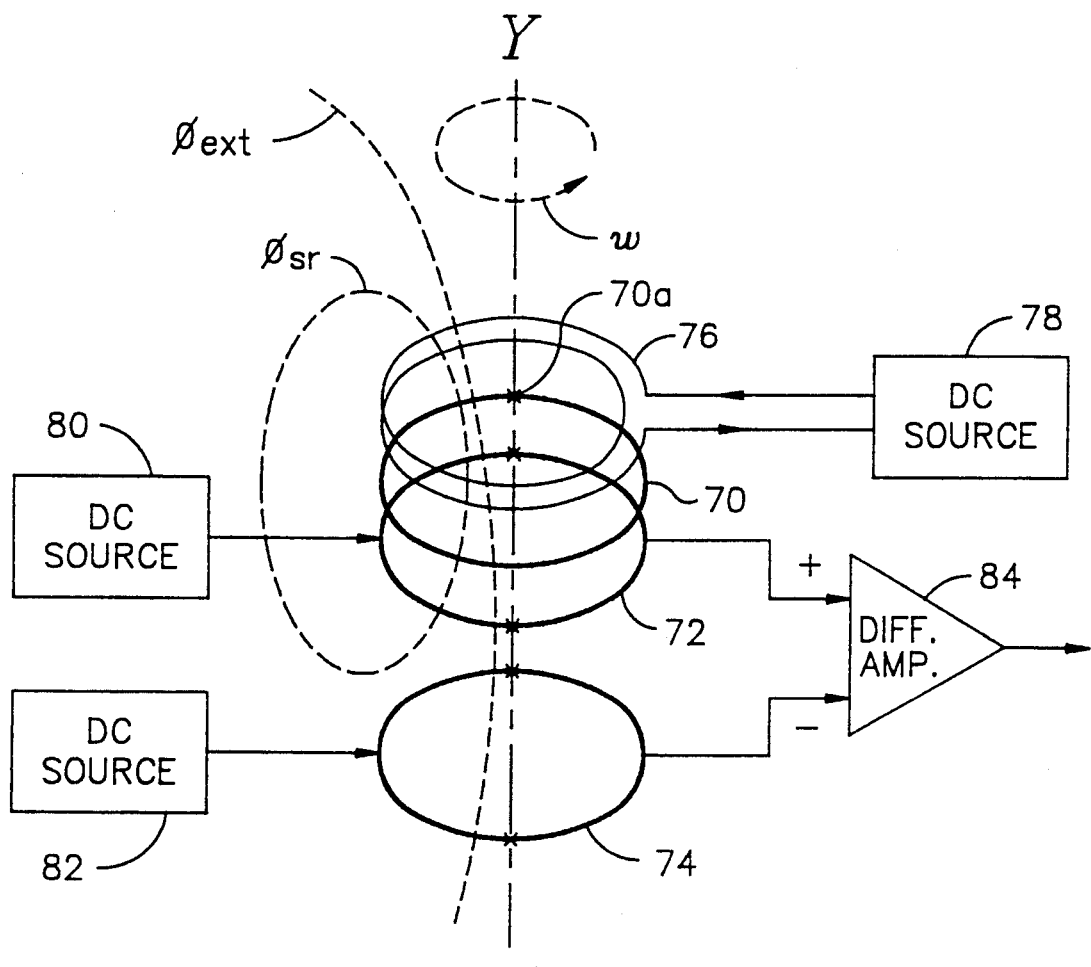
FIG. 6 is a schematic and block diagram of a second embodiment of a gyroscope apparatus according to the invention.

Referring now to the alternate gyro embodiment of FIG. 6, a superconducting ring 70 having one Josephson junction 70a defines a symmetry axis Y—Y' sensitive to the rate of rotation $\omega$. The magnetic fields are detected directly by SQUIDS 72 and 74 coaxially aligned on axis Y-Y' in a housing such as shown in FIGS. 1 and 2. A persistent current is generated in ring 70 by the field generated by a short burst of current in a starting coil 76 from a current source 78 at the transition temperature of the superconducting ring 70. SQUID 72 is located close to ring 70 and detects the magnetic field $\omega_{sr}$ due to rotation plus any external ambient or magnetic field $\omega_{ext}$ at the gyroscope. SQUID 74 is located remote from ring 70 and only senses the external field $\omega_{ext}$. Constant currents derived from current sources 80 and 82 are connected respectively to SQUIDS 72 and 74 and the outputs thereof are fed to a differential amplifier 84. Since the external magnetic field terms $\omega_{ext}$ cancel each other, the signal difference is indicative of the flux $\omega_{sr}$ due to the rate of rotation.

Figure 7:
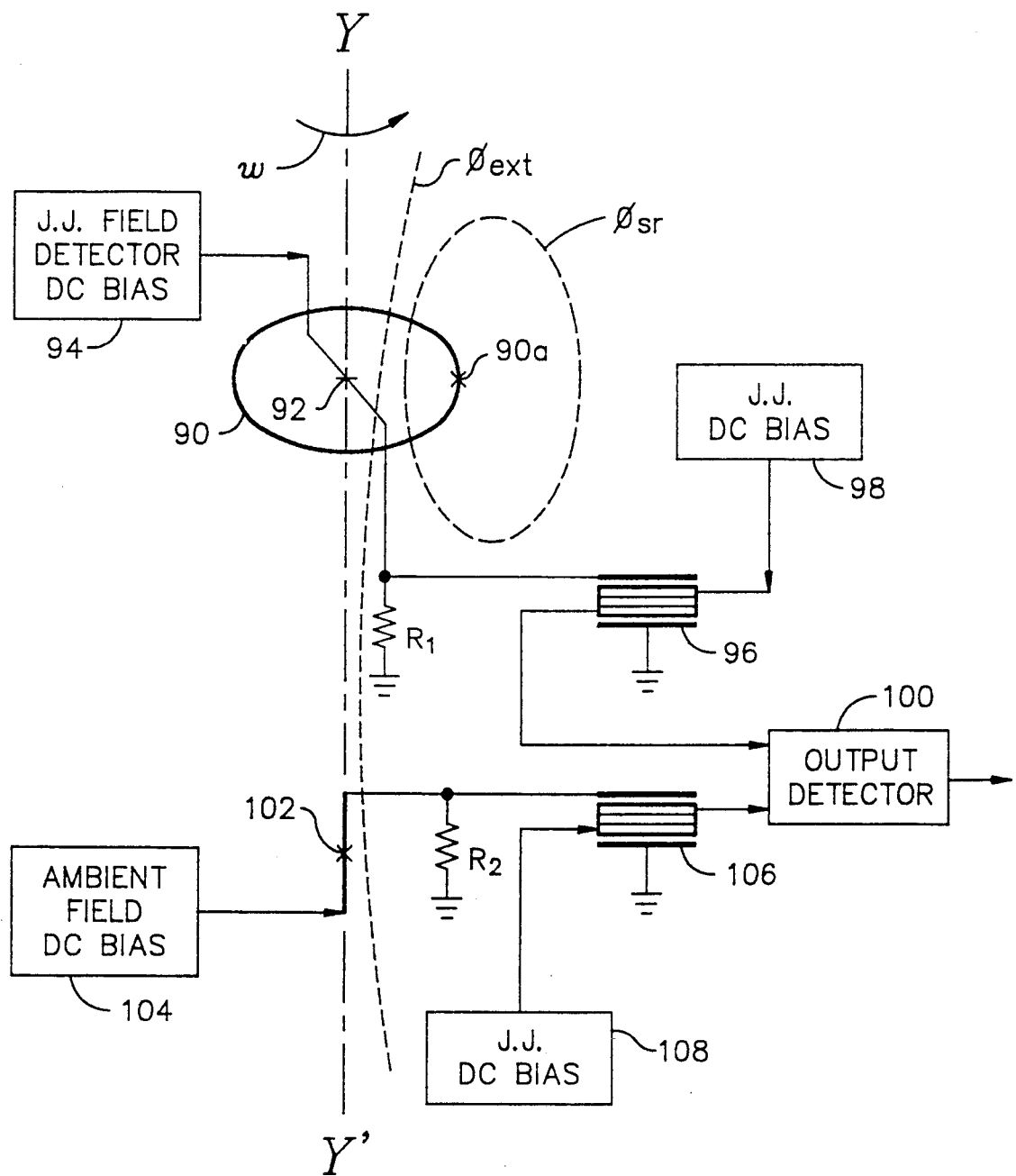
FIG 7 is a schematic and block diagram of a third embodiment of a gyroscope apparatus according to the invention.

The embodiment illustrated in FIG. 7 utilizes RF detection circuits. A persistent current is initiated in a superconducting ring 90 which includes a Josephson junction 90a similar to the above-described embodiments. However, the detecting mechanism is a thin film barrier or Josephson junction 92 of ring 90 separating two superconducting terminals at the symmetry axis Y—Y' of ring 90. A detector bias current from a DC source 94 is passed through junction 92 which monitors the change in magnetic field from the ring 90. The change in flux due to both the external field and rotation $\omega$ produces a proportional output current from junction 92. A resistor $R_1$ transforms the current into a voltage which is placed across a Josephson junction 96. A bias current applied by a constant current source 98 through junction 96 is fed to one input of a detector 100 to produce a high frequency oscillation proportional to the sum of the two fields.

A second Josephson junction 102 remote from ring 90 monitors the external or ambient field only. A bias current from a current source 104 passes through junction 102 changing its output as a function of the external field. A voltage developed across a resistor $R_2$ is placed across another Josephson junction 106, and a source 108 provides a constant current to junction 106. Like Josephson junction 96, the output is a high frequency oscillation proportional to the external field. The two signals from junctions 96 and 106 are then digitized and the ambient field is subtracted to eliminate the external field contribution. Therefore, assuming ample magnetic shielding from external fields, an output proportional to the angular rate $\omega$ of rotation is indicated.

Some of the many advantages and novel features of the invention should now be readily apparent. A highly accurate solid state device is provided for measuring the angular rate of rotation with a significant reduction in size and weight. For example, a gyroscope apparatus is possible which is especially suitable for use in guidance and navigation systems of missiles, aircraft and similar platforms where such limitations are critical. The invention measures the rotation rate of a platform with no spinning components. In contrast to mechanical and laser gyros, random wander errors due to noise from mechanical dither and spontaneous photon emission are obviated. The sensing mechanism is a persistent current of Cooper-paired electrons traveling around a ring accumulating phase change due to rotational translation of the electrons around the ring.

Many modifications and variations of the present invention are possible in view of the above disclosure. It is therefore to be understood, that within the scope of the appended claims, the invention may be practiced otherwise than as specifically described.

I claim:
1. Gyroscope apparatus suitable for use in navigation comprising, in combination:
   a chamber mounted on a platform;
   a superconductive toroid disposed in said chamber and having a Josephson junction radially interposed therein;
   a coolant communicating with said chamber for maintaining said toroid below the superconducting transition temperature thereof;
   starting means disposed in proximity to said toroid for initiating a persistent current therein;
   first detecting means disposed in close proximity to said toroid for detecting the ambient magnetic field and the magnetic field generated by the persistent current in said toroid and producing a signal indicative of the sum of said fields;
   second detecting means disposed in a region remote from said toroid for detecting the ambient magnetic field and producing a signal indicative of said ambient magnetic field; and
   subtracting means connected to said first and second detecting means for producing an output signal indicative of the rate of rotation of the platform about the symmetry axis of said toroid.

2. Apparatus according to claim 1 wherein:

said first detecting means includes a coil magnetically coupled between said toroid and said subtracting means; and said second detecting means includes a coil magnetically coupled between said region and said subtracting means.

3. Apparatus according to claim 2 wherein:

said subtracting means includes an annular SQUID having a symmetry axis mutually perpendicular with the symmetry axis of said toroid, a source of constant current to said SQUID, and a detector responsive to the current output of said SQUID.

4. Apparatus according to claim 1 wherein:

said first detecting means includes a SQUID coaxially aligned with and magnetically coupled to said toroid, and a source of constant current connected to said first detecting means SQUID; and said second detecting means includes a SQUID coaxially aligned with and magnetically remote from said toroid, and a source of current connected to said second detecting means SQUID.

5. Apparatus according to claim 4 wherein:

said subtracting means includes a difference circuit responsive to the current outputs of said SQUIDS.

6. Apparatus according to claim 1 wherein:

said first detecting means includes a Josephson junction disposed on the symmetry axis of said toroid and magnetically coupled thereto, and a source of bias current connected to said first detecting means junction; and said second detecting means includes a Josephson junction disposed on the symmetry axis of said toroid and magnetically remote therefrom, and a source of bias current connected to said second detecting means junction.

7. Apparatus according to claim 6 wherein:

said subtracting means includes two resistors respectively connected to the outputs of said first and second detecting means junctions for producing voltages proportional to the detected magnetic field, converter means responsive for generating oscillating signals of frequencies proportional to the voltages, and circuit means for producing an output indicative of the frequency difference.

8. A gyroscope for measuring angular motion about a sensitive axis, comprising:

a superconducting ring coaxially aligned with the sensitive axis and including a Josephson junction for circulating a persistent current;

first measuring means arranged in magnetic proximity to said ring for measuring the ambient magnetic field and the magnetic field due to angular motion of said ring;

second measuring means arranged in an area magnetically remote from said ring for measuring only the ambient magnetic field; and indicating means responsive to said first and second measuring means for producing an output indicative of the angular motion.

9. Apparatus according to claim 8 wherein:

said measuring means includes a first coil magnetically coupled between said ring and said indicating means; and said second measuring means includes a coil magnetically coupled between said area and said indicating means.

10. Apparatus according to claim 9 wherein:

said indicating means includes an annular SQUID having a symmetry axis mutually perpendicular with the sensitive axis, a source of constant current to said SQUID, and a detector responsive to the current output of said SQUID.

11. Apparatus according to claim 8 wherein:

said first measuring means includes a SQUID coaxially aligned with and magnetically coupled to said ring, and a source of constant current connected to said measuring means SQUID; and said second measuring means includes a SQUID coaxially aligned with and magnetically remote from said ring, and a source of current connected to said second measuring means SQUID.

12. Apparatus according to claim 11 wherein:

said second detecting means includes a difference circuit responsive to the current outputs of said SQUIDS.

13. Apparatus according to claim 8 wherein:

said first measuring means includes a Josephson junction disposed on the symmetry axis of said ring and magnetically coupled thereto, and a source of bias current connected to said first measuring means junction; and said second measuring means includes a Josephson junction disposed on the symmetry axis of said ring and magnetically remote therefrom, and a source of bias current connected to said second measuring means junction.

14. Apparatus according to claim 6 wherein:

said subtracting means includes two resistors respectively connected to the outputs of said measuring means junctions for producing voltages proportional to the detected magnetic field, converter means responsive for generating oscillating signals of frequencies proportional to the voltages, and circuit means for producing an output indicative of the frequency difference.

15. A method for measuring the rate of angular motion about a sensitive axis, comprising the steps of:

imparting a persistent current in a superconducting ring having a Josephson junction;

detecting the combined flux of the magnetic field generated by the current in the ring and by the external field;

detecting only the flux produced by the external field;

determining the difference between the detected fluxes; and determining the rate of angular motion from the difference between the detected fluxes.

* * * * *